(12) United States Patent
Xu

(10) Patent No.: US 6,749,946 B1
(45) Date of Patent: Jun. 15, 2004

(54) METHOD AND COMPOSITION FOR METALLIC FINISHES

(75) Inventor: Qihua Xu, Grand Rapids, MI (US)

(73) Assignee: Lacks Enterprises, Inc., Grand Rapids, MI (US)

( * ) Notice: Subject to any disclaimer, the term of this patent is extended or adjusted under 35 U.S.C. 154(b) by 276 days.

(21) Appl. No.: 09/707,866

(22) Filed: Nov. 6, 2000

(51) Int. Cl.$^7$ ................................. B32B 15/04
(52) U.S. Cl. ................ 428/457; 428/423.1; 428/425.5; 428/425.8; 427/330; 427/348; 427/352; 427/353; 427/356; 427/358; 427/368; 427/363; 427/377; 427/378; 427/409; 427/410
(58) Field of Search .................... 428/457, 423.1, 428/425.5, 425.8; 427/348, 352, 330, 355–356, 358, 366, 363, 377, 378, 403, 410

(56) References Cited

U.S. PATENT DOCUMENTS

| | | | |
|---|---|---|---|
| 4,315,970 A | * | 2/1982 | McGee |
| 4,364,731 A | | 12/1982 | Norling et al. |
| 4,539,345 A | | 9/1985 | Hansen |
| 4,542,070 A | * | 9/1985 | Ohtani |
| 4,620,993 A | | 11/1986 | Suss et al. |
| 4,620,994 A | | 11/1986 | Suss et al. |
| 4,874,643 A | | 10/1989 | Oldham et al. |
| 4,980,196 A | | 12/1990 | Yasuda et al. |
| 5,015,506 A | | 5/1991 | Purcell |
| 5,128,391 A | * | 7/1992 | Shustack ............... 522/92 |
| 5,139,601 A | | 8/1992 | Holmes-Farley et al. |
| 5,190,795 A | | 3/1993 | Culler |
| 5,225,248 A | | 7/1993 | Stephenson |
| 5,238,708 A | | 8/1993 | Blizzard |
| 5,272,223 A | | 12/1993 | Iri et al. |
| 5,326,594 A | | 7/1994 | Sabata et al. |
| 5,342,867 A | * | 8/1994 | Ryan et al. ............ 524/101 |
| 5,389,301 A | | 2/1995 | Fenzi |
| 5,413,809 A | | 5/1995 | Hazan |
| 5,429,880 A | | 7/1995 | Kubota et al. |
| 5,547,757 A | | 8/1996 | Swarup et al. |
| 5,578,347 A | * | 11/1996 | Chan .................... 427/336 |
| 5,580,819 A | | 12/1996 | Li et al. |
| 5,753,316 A | | 5/1998 | Brent et al. |
| 5,853,809 A | | 12/1998 | Campbell et al. |
| 5,853,895 A | | 12/1998 | Lewno |
| 5,869,141 A | | 2/1999 | Blohowiak et al. |
| 5,902,645 A | | 5/1999 | Vorse et al. |
| 5,910,555 A | | 6/1999 | Ueda et al. |
| 5,985,370 A | | 11/1999 | Ohira et al. |
| 6,020,028 A | * | 2/2000 | Kinneberg ............. 427/316 |
| 6,048,579 A | | 4/2000 | Wang et al. |
| 6,068,719 A | | 5/2000 | Lewno |
| 6,071,566 A | * | 6/2000 | Brown .................. 427/387 |
| 6,098,573 A | * | 8/2000 | Oyagi et al. ........... 427/387 |
| 6,310,170 B1 | * | 10/2001 | Johnston et al. ....... 528/38 |
| 6,413,588 B1 | * | 7/2002 | Pettus et al. ........... 427/327 |

OTHER PUBLICATIONS

"Organofunctional Silane Y–9669 for Adhesives and Sealants Phenylaminosilane Adhesion Promoter"; Witco Corporation, 1998, 6 pages.

* cited by examiner

Primary Examiner—Leszek B. Kiliman
(74) Attorney, Agent, or Firm—Price, Heneveld, Cooper, DeWitt & Litton

(57) ABSTRACT

An economical process for creating decorative and/or functional finishes on chrome, involves formation of a polyurethane film on the chrome substrate, wherein a strong and durable adhesion between the polyurethane film and the metal substrate is achieved by employing a silane adhesion promoter. Specific embodiments involve the use of an aromatic amine functional silane-coupling agent and/or an epoxy functional silane-coupling agent to achieve excellent adhesion between the polyurethane film and a chrome surface.

61 Claims, No Drawings

METHOD AND COMPOSITION FOR METALLIC FINISHES

FIELD OF THE INVENTION

This invention relates to a process for depositing a polymer film on a metal surface, and more particularly to a process for applying a durable urethane film to a metal surface.

BACKGROUND OF THE INVENTION

Traditional chrome plating creates a smooth, bright chrome finish. It has long been desired to have other finishes, such as black chrome, gold-tinted chrome, and other tinted or colored metallic finishes for decorative purposes. More specifically, there is a desire for clear polymeric decorative coatings that allow the brightness and luster of chrome plating to be seen, while modifying the appearance by imparting a color or tint to the chrome plating.

Several methods have been used in an attempt to achieve colored metallic finishes. One method involves electroplating, wherein black chrome and bronze finishes can be created. A problem with the electroplating methods is that it is very difficult to consistently obtain a desired colored metallic finish. Another disadvantage with the electroplating techniques is that they are generally limited to black and bronze colors or combinations thereof.

Another method that has been used for obtaining colored metallic finishes involves physical vapor deposition (PVD). This method offers a wider variety of colors than the electroplating method. However, physical vapor deposition is very expensive, and therefore, its use for achieving a desired colored finish is extremely limited. Another problem with physical vapor deposition is that it is difficult to control the gloss of the finishes.

Another method that has been attempted for obtaining colored metallic finishes involves applying transparent organic polymer coating containing a dye, pigment or other colorant on a chrome-plated substrate. This method is convenient, and offers a very wide variety of color finishes. However, the use of organic coatings on chrome-plated substrates has been extremely limited due to poor adhesion between the organic coating and the chrome surface, especially after prolonged exposure to extreme temperature and/or humidity. Even organic polymer coating compositions which initially exhibit good adhesion have not exhibited adequate adhesive durability for most product applications. As a result, this technique has not been applied to automotive, electronic, or other durable consumer goods.

A process for adhering a relatively thick layer, e.g., 5 millimeters, of polyurethane elastomer to a metal, such as steel, iron or aluminum, is disclosed in U.S. Pat. No. 4,542,070. The process involves coating the surface of the metal with a primer composition containing a polyepoxy compound and a polyamine compound, further coating the surface with a composition containing an isocyanate compound having an isocyanate group concentration of 15–50% by weight, and casting a layer of polyurethane elastomer onto the double coated surface of the metal followed by hardening the whole system. A silane-coupling agent may be added to the primer composition to improve adhesive properties and water resistance. Disclosed examples of silane-coupling agents include gamma-glycidoxypropyltri- methoxysilane and gamma-aminopropyltriethoxysilane. Color pigments may be added to the composition. Solvents that may be used for the primer composition are those which dissolve both the polyamine compound and the polyepoxy compound, with examples including toluene, xylene, ethylbenzene, methylethylketone, methylcellosolve, ethylcellosolve and acetate esters of a cellosolve compound. The polyurethane elastomer is used to improve the durability of steel, iron and aluminum surfaces of metal articles.

SUMMARY OF THE INVENTION

In the present invention, a clear polyurethane film is adhered to a bright metal surface using a primer containing a silane-coupling agent. The polymer film may contain a coloring or tinting agent that modifies the perceived color of the underlying chrome surface.

The invention offers a process of creating unique surface finishes on chrome-plated substrates. More specifically, the process provides an economical way of creating surface finishes similar to black chrome, PVD finishes, and other colored metallic finishes, such as blue, red, green, yellow, etc. The colors and the gloss level can be varied as desired. The process employs an adhesion enhancer that can be applied as a primer or as an additive to a polyurethane composition. The adhesion performance between the chrome surface and the film is improved so that both the film and the adhesion between the film and the chrome plating are durable enough for practical applications such as in the automotive industry and in electronic devices such as cellular phones.

These and other features, advantages and objects of the present invention will be further understood and appreciated by those skilled in the art by reference to the following specification, claims and appended drawings.

DESCRIPTION OF THE PREFERRED EMBODIMENTS

In accordance with a preferred embodiment of the invention, a clear, hard polyurethane polymer film is deposited on a chrome plating by first applying an aqueous primer composition to the chrome plating, and applying a two part urethane composition over the primer composition. The primer composition is comprised, and more preferably consists essentially of, water, methanol, and a silane-coupling agent. The primer composition may be applied to a bright metal surface by spraying, dipping or wiping techniques. Preferably, the bright metal surface is cleaned prior to application of the primer composition. The applied primer composition is allowed to dry. After the primer composition has dried, a liquid urethane composition is applied over the dried primer composition, and is allowed to cure. The urethane composition can be applied by any of various techniques, including spraying, dipping or wiping techniques, with spraying being preferred. A suitable thermal cure can be achieved in about 60 minutes at 180° F. (about 82° C.).

The polyurethane films of this invention generally have a thickness of from about 5–200 microns, more typically from 10–100 microns, and preferably from 20–50 microns.

Although a desirable aesthetic finish can be achieved without pigments or dyes, the two-part urethane composition preferably includes a dye, pigment or other colorant or a mixture of colorants to create a desired tinted film.

The urethane composition may be either a one-component urethane system, or preferably a two-component urethane system. A two-component urethane system is a urethane system in which the isocyanate and polyol components are kept separate from one another until just prior to use at which time those components are mixed together and applied to a surface. Upon mixing the two components, a full urethane polymerization reaction occurs. Generally, any of a variety of two-component polyurethane systems that are suitable for forming continuous films may be used in this invention. However, preferred polyurethane systems include those comprising, as the polyol component, alpha,omega-polymethacrylate polyols. Suitable alpha,omega-polymethacrylate polyols are commercially available, or can be obtained by reacting terminally hydroxy-functional polymethacrylates, obtained by free-radical polymerization in the presence of a hydroxy-functional molecular weigh regulator, with polyols, with the addition of non-basic transesterification catalysts, in a molar ratio of polymethacrylate to polyol of from 1:1 to 1:10. Examples of monomers that may be used for forming the polymethacrylate sequence of the terminally hydroxy-functional polymethacrylate polyols include diols such as methylmethacrylate, ethylmethacrylate, propylmethacrylate, n-butylmethacrylate, isobutylmethacrylate, tert-butylmethacrylate, n-pentylmethacrylate, amylmethacrylate, n-hexylmethacrylate, n-octylmethacrylate, 2-ethylhexylmethacrylate, n-decylmethacrylate, cyclopentylmethacrylate, cyclohexylmethacrylate, 4-tert-butylcyclohexylmethacrylate, cyclooctylmethacrylate, phenylmethacrylate, isobornylmethacrylate or other acrylates or methacrylates. Examples of suitable diols for the transesterification reaction include ethylene glycol, propane-1,2-diol, propane-1,3-diol, butane-1,2-diol, butane-1,3-diol, butane-1,4-diol, neopentylglycol, hexane-1,6-diol, octane-1,8-diol, decane-1,10-diol, doceane-1,12-diol, cyclopentane-1,2-diol, cyclohexane-1,2-diol, cyclohexane-1,4-diol, diethylene glycol, triethylene glycol, polyethylene glycol, polypropylene glycol, polybutylene glycol, polyoxyethylene-polyoxypropylenediols, 2,3-butene-1,4-diol, 1,2-hydroxymethylbenzene, and 1,4-dihydroxymethylbenzene. However, polyols having three or more hydroxyl functional groups may be employed.

The polyol components of the two-component urethane system may have a number-average molecular weight of from about 1,000 to about 30,000 Daltons, a hydroxyl number of between 20 and 200 mg of KOH/g, and an acid number of between 5 and 150 mg of KOH/g.

In addition to the alpha,omega-polymethacrylate polyols, other polyols may be employed. For example, to increase the hardness of the cured polyurethane film, aliphatic, cycloaliphatic, arylaliphatic and/or aromatic diols and/or polyols, having a molecular weight of from about 60 to about 4,000 Daltons, may be employed. In order to increase flexibility of the cured urethane film, saturated and/or unsaturated polyester diols and/or polyester polyols and/or polyether diols and/or polyether polyols having a number-average molecular weight of from about 400 to about 5,000 Daltons may be employed. Polyester diols may be prepared by esterifying organic dicarboxylic acids or their anhydrides with organic diols, or from a hydroxy carboxylic acid or from a lactone. Branched polyester polyols may be prepared by employing polyols or polycarboxylic acids having a higher functionality.

Other suitable polyurethane compositions may comprise, as the polyol component, various polyether polyols generally derived from cyclic ethers, and various polyester polyols, such as those obtained from residues of terephthalic acid production or by transesterification of dimethyl terephthalate or poly(ethylene terephthalate) with glycols.

Examples of suitable polyisocyanate compounds that may be used in the two-component urethane systems include monomeric organic polyisocyanates having a molecular weight of from about 140 to 300 Daltons, lacquer polyisocyanates having a molecular weight of from about 300 to 1,000 Daltons, and isocyanate-functionalized prepolymers containing urethane groups and having a molecular weight above 1,000 Daltons, as well as mixtures thereof.

Examples of monomeric polyisocyanates include 1,4-diisocyanato-butane, 1,6-diisocyanatohexane, 1,5-diisocyanato-2,2-dimethyl-pentane, 2,2,4-trimethyl-1,6-diisocyanatohexane, 2,4,4-trimethyl-1,6-diisocyanatohexane, 1-isocyanato-3,3,5-trimethyl-5-isocyanatomethylcyclohexane, 1-isocyanato-1-methyl-4(3)-isocyanatomethylcyclohexane, bis-(4-isocyanatocyclohexyl)methane, 1,10-diisocyanatodecane, 1,12-diisocyanatododecane, cyclohexane-1,3-diisocyanate, cyclohexane-1,4-diisocyanate, xylylenediisocyanate isomers, 2,4-diisocyanatotoluene and mixtures thereof with 2,6-diisocyanatotoluene, 2,2'-diisocyanatodiphenylmethane, 2,4"-diisocyanatodiphenylmethane, 4,4"-diisocyanatodiphenylmethane, and mixtures of the preceding polyisocyanates. Lacquer polyisocyanates are obtained by oligomerizing monomeric diisocyanates to form carbodiimide, uretdione (dimers), isocyanurate (trimers), biuret, urea, urethane, allophanate and/or oxadiazine groups. Several of these groups may be formed simultaneously or successively during oligomerization.

Examples of isocyanate functionalized prepolymers containing urethane groups having a molecular weight of about 1,000 or above may be prepared by reacting monomeric diisocyanates and/or lacquer polyioscyanates with an organic polyhydroxyl compound having a molecular weight of about 300 or greater. The polyhydroxyl compounds typically used to prepare isocyanate functionalized prepolymers are those having a number average molecular weight that is preferably greater than 500 Daltons, and more preferably from about 500 Daltons to about 4,000 Daltons. These polyhydroxyl compounds typically have from 2 to 6, and more typically from about 2 to 3 hydroxyl groups from molecule, and are generally selected from ether, ester, thioether, carbonate and/or polyacrylate polyols.

To prepare a two-component coating composition for use in practicing this invention, one or more polyols, and one or more polyisocyanates are mixed together in amounts corresponding to an NCO:OH equivalent ratio of from about 0.5:1 to about 2.0:1, more typically from about 0.8:1 to about 1.5:1. Various ingredients conventionally employed in urethane coating compositions may be added. These ingredients include flow control agents, viscosity-controlling additives, pigments, fillers, flatting agents, UV stabilizers and anti-oxidants and catalysts for the cross-linking reaction.

Although two-component urethane systems are preferred, one-component urethane systems may also be used. One-component urethane systems are those in which a soluble or dispersible urethane prepolymer that is the reaction product of a polyol with a polyisocyanate is provided with moisture curable functionalities or air-drying functionalities that facilitate cross-linking and formation of a film after application to a chrome or other bright metal substrate. Examples of one-component urethane systems include air-curing urethanes systems such as those in which an oligomeric urethane prepolymer is cross-linked by oxidation of unsaturated carbon-carbon double bonds in a long chain aliphatic group. Other one-component urethane systems include moisture curable urethane systems that include silanol terminated urethane prepolymers that are cross-linked by hydrolysis and silane condensation reactions upon contact with moisture.

Generally, two-component urethane compositions are preferred because they usually exhibit better scratch resistance, and chemical resistance than one-component systems. However, the principals of this invention may be applied to other applications using a one-component urethane system when scratch-resistance and chemical resistance are not as important as it is with most automotive and electronic applications (e.g., cellular telephone housings).

The polyurethane films of this invention are preferably relatively hard and non-elastomeric, and exhibit a pencil hardness of from about 3H to about 6H.

Depending on the selection of polyisocyanates, polyols, and additives, the coating composition may be solventless, aqueous-based, or organic solvent-based.

The description is intended to provide examples of suitable polyols and polyisocyanates that may be employed in the practice of this invention. However, the invention is not limited to any particular two-component polyurethane systems. Two-component urethane systems containing acrylic polyols such as polymeric/oligomeric materials comprised of acrylates, methacrylates, acrylonitrile, methacrylonitrile, or combinations of these monomers etc. are suitable and/or preferred. However, other polyurethane compositions such as polyether based urethane systems are also believed to be suitable for various automotive, appliance and consumer electronics applications. It is believed that the principles of this invention may also be applied to various applications in which it is desirable to strongly adhere a polyurethane film to the surface of a metal. More specifically, it is believed that use of silane-coupling agent or adhesion enhancer, either in a primer that is applied to a metal and dried before application of a two-component urethane system, or added into a two-component urethane system, allows a strong, durable bond to be formed between the metal and a cured polyuretaane film. Generally any of a variety of commercially available two-component urethane compositions may be employed in accordance with this invention to provide an aesthetic or functional film that is strongly adhered to a metal surface.

The silane adhesion enhancer may be employed in a primer composition in an amount of from about 0.05 to about 5%, and more preferably from about 0.5 to about 2%, by weight of the primer composition, with an amount of 1% being most preferred. Preferably, the primer composition is an aqueous solution that is free, or at least substantially free, of environmentally undesirable volatile organic compounds. Preferably, the aqueous primer composition is comprised of, and more preferably consists essentially of, water, methanol, and one or more silane adhesion enhancers. The aqueous primer composition may contain from about 50% to about 95% water, and from about 5 to 50% methanol.

When the silane adhesion enhancer is added directly to a liquid two-component urethane composition, rather than to an aqueous primer composition, the silane adhesion enhancer may be employed in an amount from about 0.05% to about 5%, more preferably from about 0.5% to about 2%, and most preferably about 1%, by weight of the urethane composition. When the silane adhesion enhancer is added directly to the urethane composition, the urethane composition is applied directly to a clean, but otherwise untreated, surface of a chrome plate.

Examples of silane compounds that may be employed as adhesion enhancers include gamma-glycidoxypropyl-trimethoxysilane, gamma-aminopropyltriethoxysilane, gamma-mercaptopropyltrimethoxysilane, and the like. However, preliminary testing has strongly suggested that epoxy functional silane-coupling agents (e.g., gamma-glycidoxypropyltrimethoxysilane) and aromatic amine functional silane-coupling agents, such as N-phenyl-gamma-aminopropyltrimethoxysilane are particularly useful for achieving strong, durable adhesion between a chrome plate and a cured polyurethane film. A variety of suitable silane adhesion promoters (coupling-agents), including the preferred aromatic amine functional silane-coupling agents and epoxy functional coupling-agents, are well known and commercially available. Examples of other suitable silanes include amine silanes such as N-beta(aminoethyl)-gamma-aminopropyltrimethoxysilane and gamma-aminopropyltriethoxysilane.

A particular use of this invention involves application of a tinted or colored decorative polymer film to a chrome plate to impart a desired hue or color to the chrome plate while also allowing the brightness and luster of the chrome plate to be seen through the film. Therefore, in accordance with this aspect of the invention, any of various dyes, pigments, or other colorants, or mixtures of colorants may be added in an amount effective to impart a desired color, tint or hue to a chrome plate. Suitable colorants and amounts thereof are well known and/or can be easily determined by routine experimentation. The tinted urethane compositions of this invention, when applied to a chrome plate or other metal surface, create a unique surface finish that is different from conventional paint or traditional chrome plated finishes. The tinted finishes can be generally any color in the spectrum, e.g., gray, gold, red, blue, etc.

Although the invention is expected to be used primarily on chrome surfaces, the principles of this invention may be used for adhering a polyurethane film to various other bright metal surface, such as nickel, nickel alloys, tin, tin alloys (e.g., tin-cobalt alloys) and stainless steel.

Preliminary testing has shown that urethane coatings applied to a chrome substrate in accordance with this invention demonstrate outstanding adhesion even after an extended period of time under a humid environment.

The following examples are illustrative of certain aspects of the invention.

Adhesion tests were conducted on coated samples using the compositions and processes of this invention (Examples 4–8) and compared with the adhesion results of a conventional urethane coating composition (Example 9). Adhesion testing was conducted by keeping coated samples at ambient temperature for at least 4 hours, then immersing the samples in water at 38° C. for 10 days. Thereafter a grid pattern was cut into each sample. The lines in the grid pattern were 2 mm apart from each other. A pressure sensitive adhesive tape was used to evaluate adhesion. The average percentage of coating that remained after the tape was pressed onto the grid and peeled away was used as an indication of adhesive strength or quality. Examples 1–3 describe preparation of primer solutions according to the invention.

EXAMPLE 1

Preparation of Primer Solution 1

In a clean beaker, 105 ml of methanol and 35 ml of deionized water were combined. Then 0.6 ml of A-187 silane (gamma-glycidoxypropyltrimethoxysilane), available from OSI Specialties, was slowly added under stirring. The solution was allowed to age for 4 hours at room temperature.

EXAMPLE 2

Preparation of Primer Solution 2

In a clean beaker, 250 ml of methanol and 750 ml of deionized water were combined. The pH of the solution was adjusted to a value of 5.4 with acetic acid. Then 5 ml of A-187 silane was slowly added under stirring. The solution was allowed to age for 4 hours at room temperature before use.

EXAMPLE 3

Preparation of Primer Solution 3

In a clean beaker, 50 ml methanol, 7 ml of A-187 silane and 3 ml of A1170 silane [bis(gamma-trimethoxysilyl-propyl)amine], available for OSI Specialties, was added. The solution was stirred for 5 minutes at room temperature. The solution was allowed to age overnight at room temperature. In a separate beaker, 200 ml of isopropyl alcohol and 25 ml de-ionized water were combined. The 6 ml of solution 3 was added under stirring. The primer solution was allowed to age for 4 hours at room temperature before use.

EXAMPLE 4

On 4"×4" chrome-plated plaques, the primer solution 1 was applied by spraying and dried for 5 minutes at room temperature. A two-part urethane clear coating (SL201 from Red Spot Paint & Vanish) was mixed based on the suggested ratio and applied by spray and cured for 1 hour at 180 F. The adhesion tested by adhesion tape was improved after temperature and humidity cycle as compared with a control (Example 9). More specifically, the average percentage of coating that remained after the tape was removed was about 90%, as compared with about 50% for the conventional urethane coating.

EXAMPLE 5

On 4"×4" chrome-plated plaques, the primer solution 2 was applied by wiping and dried for 5 minutes at room temperature. A two-component urethane clear coating (SL201 from Red Spot Paint & Vanish) was mixed based on the suggested ratio and applied by spray and cured for 1 hour at 180 F. The adhesion tested by adhesion tape was improved after temperature and humidity cycle as compared with a control (Example 9). More specifically, the average percentage of coating that remained after the tape was removed was about 90%, as compared with about 50% for the conventional urethane coating.

EXAMPLE 6

On 4"×4" chrome-plated plaques, the primer solution 3 was applied by dipping and dried for 5 minutes at room temperature. A two-part urethane clear coating (SL201 from Red Spot Paint & Vanish) was mixed based on the suggested ratio and applied by spray and cured for 1 hour at 180 F. The adhesion tested by adhesion tape was improved after temperature and humidity cycle as compared with a control (Example 9). More specifically, the average percentage of coating that remained after the tape was removed was about 90%, as compared with about 50% for the conventional urethane coating.

EXAMPLE 7

A two-part urethane clear coating (SL201 from Red Spot Paint & Vanish) was mixed based on the suggested ratio. Silane A-187 was added at 0.5% to the total mixed paint by volume. The coating was applied by spraying on the chrome-plated plaques and cured for 1 hour at 180 F. The adhesion tested by adhesion tape was improved after temperature and humidity cycle as compared with a control (Example 9). More specifically, the average percentage of coating that remained after the tape was removed was about 90%, as compared with about 50% for the conventional urethane coating.

EXAMPLE 8

A two-part urethane clear coating (SL201 from Red Spot Paint & Vanish) was mixed based on the suggested ratio. Silane Y-6996 (N-phenyl-gamma-aminopropyltrimethoxysilane), available from OSI Specialties, was added at 0.5% to the total mixed paint by volume. The coating was applied by spraying on the chrome-plated plaques and cured for 1 hour at 180 F. The adhesion tested by adhesion tape was improved after temperature and humidity cycle as compared with a control (Example 9). More specifically, the average percentage of coating that remained after the tape was removed was about 100%, as compared with about 50% for the conventional urethane coating.

EXAMPLE 9

Control

A two-part urethane clear coating (SL201 from Red Spot Paint & Vanish) was mixed based on the suggested ratio. The coating was applied by spray on the chrome-plated plaques and cured for 1 hour at 180 F. The adhesion tested by adhesion tape was poor after temperature and humidity cycle. More specifically, the average percentage of coating that remained after the tape was removed was about 50%.

The above description is considered that of the preferred embodiments only. Modifications of the invention will occur to those skilled in the art and to those who make or use the invention. Therefore, it is understood that the embodiments described above are merely for illustrative purposes and not intended to limit the scope of the invention, which is defined by the following claims as interpreted according to the principles of patent law, including the doctrine of equivalents.

The invention claimed is:

1. A process for forming a polymer film on a chrome plate, comprising:

applying an aqueous primer composition to the chrome plate, the primer composition containing at least one silane adhesion promoter selected from aromatic amine functional silane-coupling agents and epoxy functional silane-coupling agents;

drying the applied primer composition;

applying a urethane composition over the chrome plate on which the aqueous primer was applied and dried; and curing the urethane composition to form a polyurethane film.

2. The process of claim 1, wherein the silane adhesion promoter is an aromatic amine functional silane-coupling agent.

3. The process of claim 2, wherein the aromatic amine functional silane-coupling agent is N-phenyl-gamma-aminopropyltrimethoxysilane.

4. The process of claim 1, wherein the silane adhesion promoter is an epoxy functional silane-coupling agent.

5. The process of claim 4, wherein the epoxy functional silane-coupling agent is glycidoxypropylmethoxysilane.

6. The process of claim 1, wherein the silane adhesion promoter is present in the aqueous primer composition in an amount of from about 0.05% to about 5% by weight.

7. The process of claim 1, wherein the silane adhesion promoter is present in the aqueous primer composition in an amount of from about 0.5% to about 2% by weight.

8. The process of claim 1, wherein the silane adhesion promoter is present in the aqueous primer composition in an amount of about 1% by weight.

9. The process of claim 1, wherein the urethane composition includes a polymethacrylate polyol.

10. The process of claim 1, wherein the urethane composition further comprises a colorant in an amount effective to impart a desired color, tint or hue to the chrome plate.

11. The process of claim 1, wherein the polyurethane film has a thickness of from 5–200 microns.

12. The process of claim 1, wherein the polyurethane film has a pencil hardness of from about 3H to 6H.

13. A process for forming a polymer film on a bright metal surface selected from chrome, nickel, nickel alloys, tin, tin alloys, and stainless steel, comprising:

applying an aqueous primer composition to the bright metal surface, the primer composition containing a silane adhesion promoter that is selected from the group consisting of aromatic amine functional silane-coupling agents and epoxy functional silane-coupling agents;

drying the applied primer composition;

applying a urethane composition over the metal surface on which the aqueous primer was applied and dried; and curing the urethane composition to form a polyurethane film.

14. The process of claim 13, wherein the silane adhesion promoter is gamma-glycidoxypropylmethoxysilane.

15. The process of claim 13, wherein the silane adhesion promoter is N-phenol-gamma-aminopropyltrimethoxysilane.

16. The process of claim 13, wherein the silane adhesion promoter is present in the aqueous primer composition in an amount of from about 0.05% to about 5% by weight.

17. The process of claim 13, wherein the silane adhesion promoter is present in the aqueous primer composition in an amount of from about 0.5% to about 2% by weight.

18. The process of claim 13, wherein the silane adhesion promoter is present in the aqueous primer composition in an amount of about 1% by weight.

19. The process of claim 13, wherein the urethane composition includes a polymethacrylate polyol.

20. The process of claim 13, wherein the urethane composition further comprises a colorant in an amount effective to impart a desired color, tint or hue to the chrome plate.

21. The process of claim 13, wherein the polyurethane film has a thickness of from 5–200 microns.

22. The process of claim 13, wherein the polyurethane film has a pencil hardness of from about 3H to 6H.

23. An article comprising:

a chrome plate;

a polyurethane film adhered to the chrome plate; and a silane adhesion promoter enhancing adhesion between the polyurethane film and the chrome plate, the silane adhesion promoter including at least one silane adhesion promoter selected from aromatic amine functional silane-coupling agents and epoxy functional silane-coupling agents.

24. The article of claim 23, wherein the silane adhesion promoter is an aromatic amine functional silane-coupling agent.

25. The article of claim 24, wherein the aromatic amine functional silane-coupling agent is N-phenyl-gamma-aminopropyltrimethoxysilane.

26. The article of claim 23, wherein the silane adhesion promoter is an epoxy functional silane-coupling agent.

27. The article of claim 26, wherein the epoxy functional silane-coupling agent is glycidoxypropylmethoxysilane.

28. The article of claim 23, wherein the urethane composition includes a polymethacrylate polyol.

29. The article of claim 23, wherein the urethane composition further comprises a colorant in an amount effective to impart a desired color, tint or hue to the chrome plate.

30. The process of claim 23, wherein the polyurethane film has a thickness of from 5–200 microns.

31. The process of claim 23, wherein the polyurethane film has a pencil hardness of from about 3H to 6H.

32. An article comprising:

a bright metal substrate selected from chrome, nickel, nickel alloys, tin, tin alloys, and stainless steel;

a polyurethane film adhered to the metal substrate; and a silane adhesion promoter enhancing adhesion between the polyurethane film and the metal substrate, the silane adhesion promoter selected from the group consisting of epoxy functional silane-coupling agents and aromatic amine functional silane-coupling agents.

33. The article of claim 32, wherein the silane adhesion promoter is gamma-glycidoxypropylmethoxysilane.

34. The article of claim 32, wherein silane adhesion promoter is N-phenol-gamma-aminopropyltrimethoxysilane.

35. The article of claim 32, wherein the urethane composition includes a polymethacrylate polyol.

36. The article of claim 32, wherein the urethane composition further comprises a colorant in an amount effective to impart a desired color, tint or hue to the chrome plate.

37. The process of claim 32, wherein the polyurethane film has a thickness of from 5–200 microns.

38. The process of claim 32, wherein the polyurethane film has a pencil hardness of from about 3H to 6H.

39. A process for forming a polyurethane film on a chrome plate, comprising:

applying a urethane composition to the chrome plate, the urethane composition containing at least one silane adhesion promoter selected from epoxy functional silane-coupling agents and aromatic amine functional silane-coupling agents; and curing the urethane composition to form a polyurethane film.

40. The process of claim 39, wherein the silane adhesion promoter is an aromatic amine functional silane-coupling agent.

41. The process of claim 40, wherein the aromatic amine functional silane-coupling agent is N-phenyl-gamma-aminopropyltrimethoxysilane.

42. The process of claim 39, wherein the silane adhesion promoter is an epoxy functional silane-coupling agent.

43. The process of claim 42, wherein the epoxy functional silane-coupling agent is glycidoxypropylmethoxysilane.

44. The process of claim 39, wherein the silane adhesion promoter is present in the urethane composition in an amount of from about 0.05% to about 5% by weight.

45. The process of claim 39, wherein the silane adhesion promoter is present in the urethane composition in an amount of from about 0.5% to about 2% by weight.

46. The process of claim 39, wherein the silane adhesion promoter is present in the urethane composition in an amount of about 1% by weight.

47. The process of claim 39, wherein the urethane composition includes a polymethacrylate polyol.

48. The process of claim 39, wherein the urethane composition further comprises a colorant in an amount effective to impart a desired color, tint or hue to the chrome plate.

49. The process of claim 39, wherein the polyurethane film has a thickness of from 5–200 microns.

50. The process of claim 39, wherein the polyurethane film has a pencil hardness of from about 3H to 6H.

51. A process of forming a polymer film on a bright metal surface selected from chrome, nickel, nickel alloys, tin, tin alloys, and stainless steel, comprising:

applying a urethane composition to the metal surface, the urethane composition containing a silane adhesion promoter that is selected from the group consisting of aromatic amine functional silane-coupling agents and epoxy functional silane-coupling agents; and curing the urethane composition to form a polyurethane film.

52. The process of claim 51, wherein the silane adhesion promoter is gamma-glycidoxypropylmethoxysilane.

53. The process of claim 51, wherein the silane adhesion promoter is N-phenol-gamma-aminopropyltrimethoxysilane.

54. The process of claim 51, wherein the silane adhesion promoter is present in the urethane composition in an amount of from about 0.05% to about 5% by weight.

55. The process of claim 51, wherein the silane adhesion promoter is present in the urethane composition in an amount of from about 0.05% to about 2% by weight.

56. The process of claim 51, wherein the silane adhesion promoter is present in the urethane composition in an amount of about 1% by weight.

57. The process of claim 51, wherein the urethane composition includes a polymethacrylate polyol.

58. The process of claim 51, wherein the urethane composition further comprises a colorant in an amount effective to impart a desired color, tint or hue to the chrome plate.

59. The process of claim 51, wherein the polyurethane film has a thickness of from 5–200 microns.

60. The process of claim 51, wherein the polyurethane film has a pencil hardness of from about 3H to 6H.

61. A process for imparting a color to a lustrous, bright metal surface without obscuring the brightness and luster of the metal surface, comprising:

providing a bright, lustrous metal surface selected from chrome, nickel, nickel alloys, tin, tin alloys and stainless steel;

applying an aqueous primer composition to the metal surface, the primer composition containing a silane adhesion promoter selected from aromatic amine functional silane-coupling agents and epoxy functional silane coupling agents;

drying the applied primer composition;

applying a urethane composition over the metal surface on which the aqueous primer composition was applied and dried; and curing the urethane composition to form a polyurethane film.

* * * * *